United States Patent [19]

Klosterboer

[11] Patent Number: 4,807,972

[45] Date of Patent: Feb. 28, 1989

[54] TEMPERATURE COMPENSATING DRIVER FOR A LIQUID CRYSTAL DISPLAY

[75] Inventor: Robert A. Klosterboer, Linden, Mich.

[73] Assignee: American Microsystems, Inc., Pocatello, Id.

[21] Appl. No.: 820,853

[22] Filed: Jan. 21, 1986

[51] Int. Cl.$^4$ .............................................. G02F 1/13
[52] U.S. Cl. ............................ 350/331 T; 350/331 R; 350/332
[58] Field of Search ............... 350/331 R, 931 T, 332

[56] References Cited

U.S. PATENT DOCUMENTS 4,121,203  10/1978  Edwards et al. .................. 350/332
4,297,697  10/1981  Mitsui ................................ 350/332

FOREIGN PATENT DOCUMENTS 0224827  12/1984  Japan ............................. 350/331 T
60-02273  5/1985  Japan ................................ 350/332

Primary Examiner—Stanley D. Miller
Assistant Examiner—Trong Quang Phan

[57] ABSTRACT

A circuit (8) is provided for driving the segment and back plane of a liquid crystal display. The circuit includes a plurality of transistors (Q1 to Q10) connected such that the base emitter junctions of the transistors are coupled in series between a voltage source and ground. The voltage at the emitter one of the transistors (Q3) is used to provide a first voltage (VLOW) for driving the LCD and a voltage at the emitter one of the other transistors (Q10) is used to provide the other voltage (VHIGH) for driving the LCD. Of importance, because the difference between the first and second voltages depends upon the voltage drop across a set of PN junctions, this difference in voltage varies with temperature. Specifically, the difference in voltage increases at low temperatures and decreases at high temperatures. In this way, the voltage used to drive the LCD is automatically compensated for temperature variations.

11 Claims, 2 Drawing Sheets

TEMPERATURE COMPENSATING DRIVER FOR A LIQUID CRYSTAL DISPLAY

BACKGROUND OF THE INVENTION

This invention relates to liquid crystal displays (LCDs) and more specifically to temperature compensating drivers for LCDs.

LCDs are well known in the art. A typical LCD includes a back plane coupled to a back plane lead and eight segments, each segment being coupled to an associated segment lead. When the voltage at a given segment lead exceeds the voltage at the back plane by a predetermined threshold voltage, the associated segment is dark and therefore visible. Similarly, if the voltage at the back plane exceeds the voltage at the segment lead by the predetermined threshold voltage, the segment is dark and therefore visible. However, if the voltage at the segment lead equals the voltage at the back plane, the segment is transparent and therefore not visible. The eight segments are typically arranged so that any of a number of alphanumeric characters can be displayed by selectively darkening various combinations of segments.

Another type of LCD is the biplexed LCD. A typical biplexed LCD includes sixteen segments and two back planes, each segment being associated with one of the two back planes. Each back plane is coupled to an associated back plane lead. In addition, a typical biplexed LCD display includes eight input leads, each input lead driving two segments. Each segment is either dark or transparent depending upon the difference in the voltage at its associated input lead and its associated back plane.

The above-mentioned threshold voltage is greater at low temperatures than it is at high temperatures. Accordingly, it is desirable to drive LCDs with greater voltages at low temperatures in order to ensure that the display segments darken properly. Similarly, it is desirable to drive LCDs with lower voltages at high temperatures to avoid cross talk. (Cross talk occurs when a display segment is darkened by an attempt to darken a different display segment.

SUMMARY

A circuit constructed in accordance with the present invention drives an LCD. Of importance, the circuit provides first and second reference voltages for application to the LCD back plane and segments. The difference between the first and second voltages increases when temperature decreases and the difference in voltage decreases when temperature increases. This has the advantage of providing increased voltages to LCDs at low temperature, thereby ensuring that the segments darken properly. In addition, this has the advantage of decreasing the voltage applied to LCDs at high temperature, thereby minimizing undesired cross talk. In one embodiment of my invention, the driver circuit is coupled to a biplexed LCD display.

In one embodiment of my invention, a voltage source (for example, a conventional battery) provides a voltage across two terminals. A set of diodes and a resistor are coupled in series between the two terminals. A first lead is coupled to a node between a first pair of diodes within the set of diodes and a second lead is coupled to a node between a second pair of diodes within the set of diodes. The voltages of these two leads are selectively coupled to the LCD. Of importance, since the difference in voltage at these two nodes is dependent upon the voltage drop across the diodes within the set of diodes, this difference in voltage increases when temperature decreases and decreases when temperature increases. This invention is better understood with reference to the drawing.

DETAILED DESCRIPTION

Figure 1:
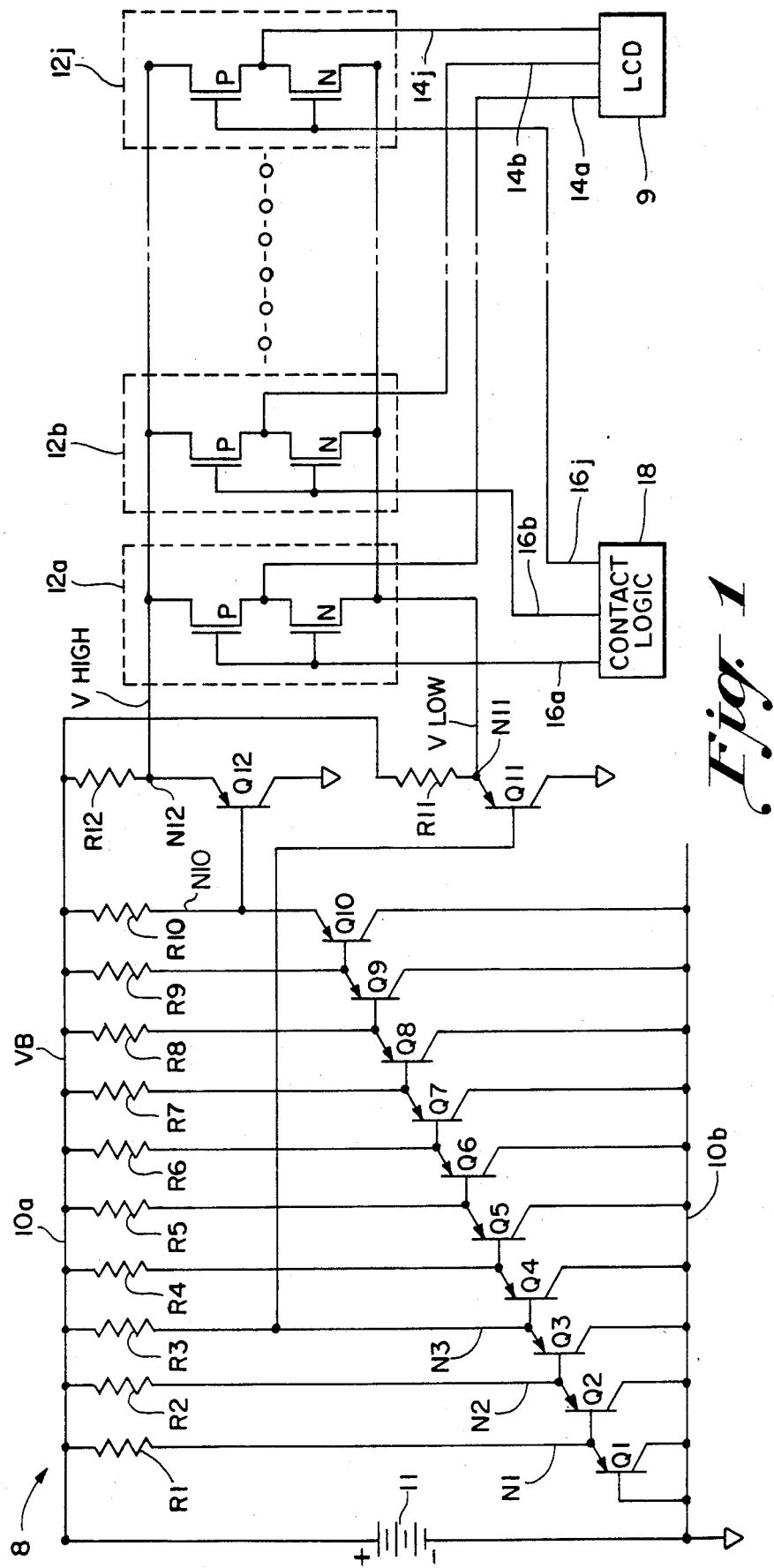
FIG. 1 schematically illustrates a circuit for driving an LCD display constructed in accordance with a first embodiment of the present invention.

FIG. 1 schematically illustrates a circuit 8 constructed in accordance with one embodiment of my invention for driving an LCD 9. Circuit 8 includes a first lead 10a for receiving an electrical potential VB and a lead 10b coupled to ground. In one embodiment of the invention, voltage VB at lead 10a is approximately 12 volts and is provided by a battery 11. Lead 10a is coupled to a number of resistors R1 through R2. In one embodiment, resistors R1 to R12 are 10K ohm resistors. Each resistor R1 through R12 is coupled to the emitter of an associated PNP transistor Q1 through Q12. The collectors of transistors Q1 through Q12 are each connected to ground. Also as can be seen in FIG. 1, the base of transistor Q1 is coupled to ground, the base of transistor Q2 is coupled to the emitter of transistor Q1, the base of transistor Q3 is coupled to the emitter of transistor Q2 and so on.

It will be appreciated by those skilled in the art that transistors Q1 through Q12 are each configured to act as diodes. Specifically, transistor Q1 provides a diode voltage drop (typically about 0.7 volts) between a node N1 to ground. Transistor Q2 provides a diode voltage drop between a node N2 and node N1. Similarly, transistor Q3 provides a diode voltage drop between a node N3 and node N2. N3 is coupled to the base of transistor Q11 which provides a diode voltage drop between a node N11 and node N3. As can be seen from FIG. 1, the voltage at node N11 is four diode drops or about 2.8 volts above ground. Similarly, the base of transistor Q12 is coupled to the emitter of transistor Q10. Transistor Q12 therefore provides a voltage of about 11 diode voltage drops (typically 7.7 volts) at a node N12. The voltage VHIGH at node N12 is the first voltage level for driving LCD 9 (e.g. voltage VHIGH is selectively applied to the back plane and segments) and the voltage VLOW at node 11 is the second voltage for driving LCD 9 (e.g. voltage VLOW is also selectively applied to the back plane and segments).

It is noted that because voltages VHIGH and VLOW are eleven diode voltage drops and four diode voltage drops above ground, respectively, the difference in voltage VHIGH and VLOW is seven diode voltage drops (about 4.9 volts). Of importance, at low temperatures, the difference between voltages VHIGH and VLOW increases because the voltage drop across each base-emitter junction of transistors Q1 to Q12 increases. Similarly, when the temperature increases, the difference between voltages VHIGH and VLOW decreases. In this way, circuit 8 provides temperature compensated drive voltages for LCD 9.

Circuit 8 includes a set of CMOS inverters 12a to 12j for driving a set of leads 14a to 14j, respectively. Leads 14a to 14j drive the segment leads and back plane leads for LCD 9, which in one embodiment is a biplexed LCD. Of importance, instead of using battery voltage VB and ground to drive leads 14a to 14j, inverters 12a to 12j drive leads 14a through 14j with voltages VHIGH or VLOW, depending on the state of inverter input leads 16a to 16j, respectively. Inverter input leads 16a to 16j are driven by a control logic circuit 18 which can be any of a number of known microprocessors or control circuits.

In one embodiment of my invention, transistors Q1 to Q12, resistors R1 to R12, inverters 12a to 12j and control logic circut 18 are part of a single CMOS integrated circuit. In such an embodiment, control logic circuit 18 within the CMOS integrated circuit uses logic voltage levels of ground and voltage VHIGH.

Figure 2:
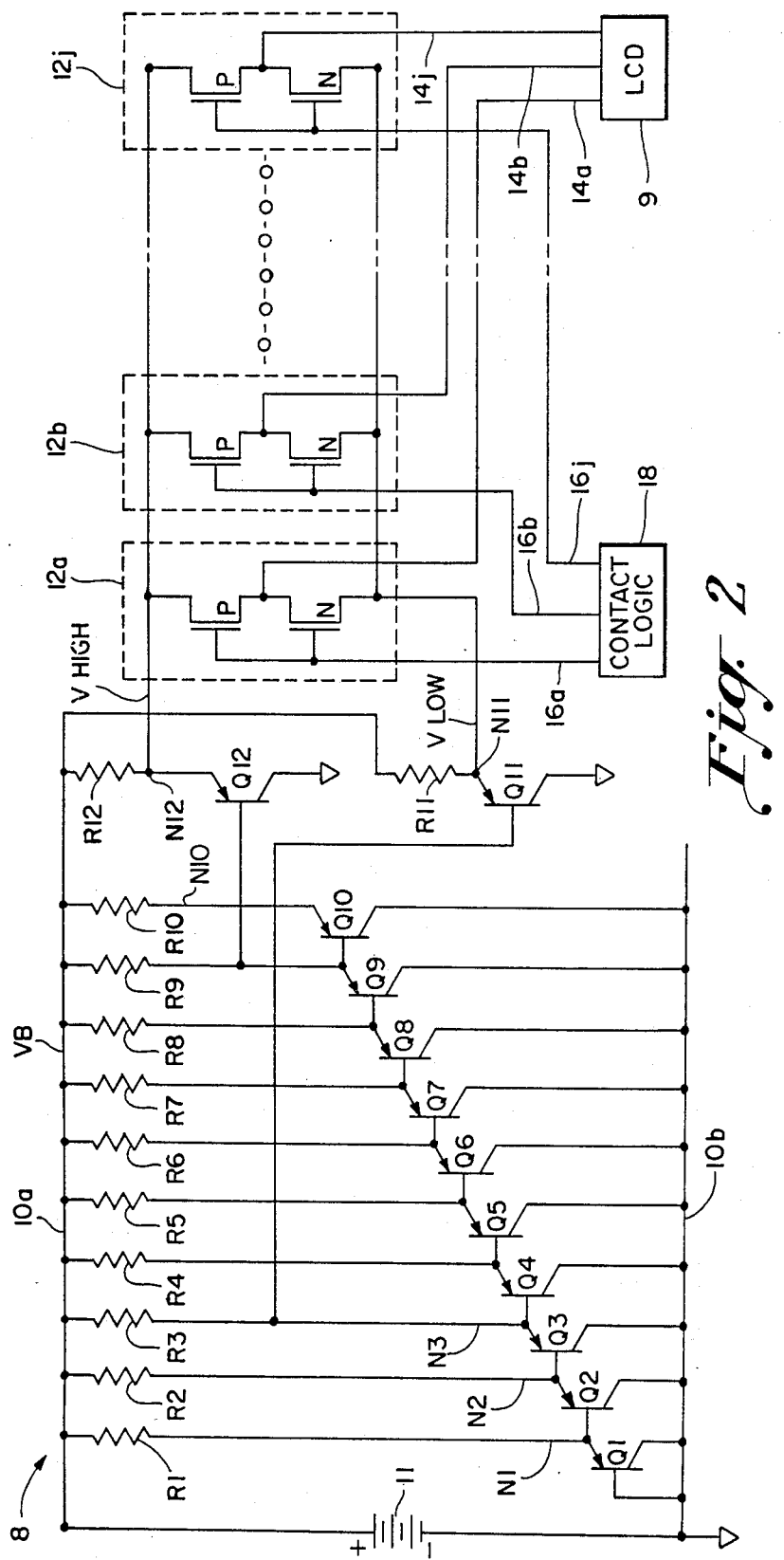
FIG. 2 schematically illustrates a circuit for driving an LCD display in accordance with a second embodiment of the present invention.

It is noted that voltages VHIGH and VLOW are generated from transistors Q11 and Q12, the bases of which are coupled to nodes N3 and N10, respectively. Those skilled in the art will appreciate that the difference between voltages VLOW and VHIGH can be increased by connecting the base of transistor Q11 to node N2, node N1 or ground as required, instead of node N3. Alternatively, node N11 can be connected to ground. Similarly, the difference between voltages VHIGH and VLOW can be decreased by connecting the bases of transistors Q11 and Q12 to appropriate transistors Q1 to Q10. For example, FIG. 2 illustrates an embodiment in which the base of transistor Q12 is coupled to the emitter of transistor Q9. In addition, in other embodiments, more than 12 transistors are used, e.g. if it is desired to drive LCD 9 with greater voltages.

The circuit of the present invention is particularly appropriate for automotive applications, as automobile electrical systems must be able to function over larger temperature variations. Further, circuits in an automobile must typically operate off of a single 12-volt battery such as battery 11. In one such embodiment, LCD 9 is a dashboard display.

While the invention has been described with reference to a specific embodiment, those skilled in the art will recognize that changes can be made in form and detail without departing from the spirit of the invention. For example, NPN transistors or conventional diodes can be used instead of PNP transistors Q1 to Q12. Accordingly, all such changes come within the present invention.

I claim:

1. A circuit for driving an LCD comprising:
   first and second leads for receiving a voltage from a voltage source;
   a plurality of forward-biased diode connected means coupled in series between said first and second leads;
   a third lead coupled to a first node located at the electrical connection between two of said diode connected means within said plurality of diode connected means, said third lead providing a first voltage for driving said LCD; and
   a fourth lead coupled to a second node located at the electrical connection between another two of said diode connected means within said plurality of diode connected means, said fourth lead providing a second voltage for driving said LCD.

2. The circuit of claim 1 wherein said plurality of diode connected means are coupled between said first lead and a third node, said circuit further comprising means for providing an electrical resistance between said third node and said second lead.

3. The circuit of claim 1 wherein the voltage at the third lead exceeds the voltage at said fourth lead by seven diode connected means voltage drops.

4. The circuit of claim further comprising plurality of bipolar transistors, each of said diode connected means comprising a PN junction, each PN junction being the base emitter junction of one of said bipolar transistors.

5. The circuit of claim 1 further comprising:
   a PMOS transistor and an NMOS transistor coupled in series between said third and fourth leads; and
   a lead couled to the node between said PMOS transistor and said NMOS transistor for driving one of the segments within said LCD.

6. The circuit of claim 1 further comprising:
   an NMOS transistor;
   a PMOS transistor, said NMOS transistor and said PMOS transistor being coupled in series between said third and fourth leads; and
   a lead coupled to the node between said PMOS and NMOS transistors, said lead driving the back plane of said LCD.

7. A circuit for driving an LCD comprising:
   first and second leads for receiving a voltage from a voltage source;
   a plurality of forward-biased diode connected means coupled in series between said first and second leads;
   a third lead coupled to a node located at the electrical connection between two of said diode connected means within said plurality of diode connected means, said third lead providing a first voltage for driving said LCD, said second lead providing a second voltage for driving said LCD.

8. The circuit of claim 1 wherein each of said diode connected means is a diode.

9. A circuit for driving an LCD comprising:
   a plurality of forward-biased diode connected means, said plurality coupled in series between a first node and a first lead;
   means for causing current to flow through said forward-biased diode connected means, said means for causing being coupled to said first node and said first lead;
   a second lead coupled to said first lead, said second lead providing a first voltage for driving said LCD; and
   a third lead coupled to said first node, said third lead providing a second voltage for driving said LCD, wherein said diode connected means are transistors and the collector of each of said transistors is connected to said first lead.

10. The circuit of claim 9 wherein said means for causing current comprises a voltage source having a first terminal coupled to said first lead and a second terminal, the base and emitter of each of said transistors being resistively coupled to said second terminal.

11. The circuit of claim 9 wherein said second lead is coupled to said first node via a plurality of said diode-connected means.

* * * * *